Jan. 30, 1962 H. E. RENAUD 3,018,520
METHOD OF MOLDING BY SPRAYING MOLTEN METAL
AND HEAT-REACTIVE BONDING AGENT
Filed Feb. 12, 1959
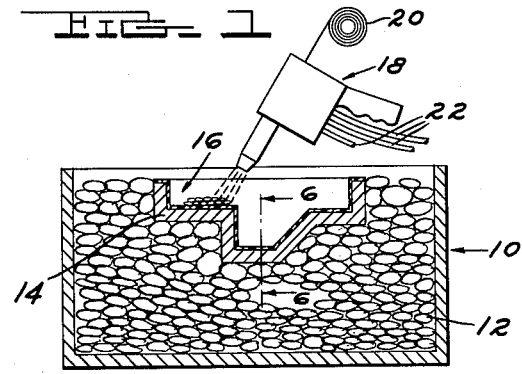
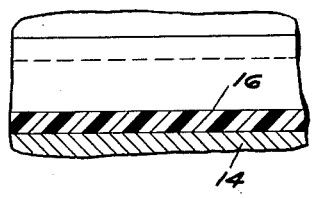
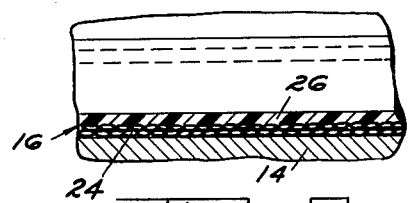
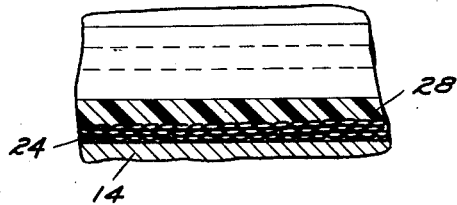
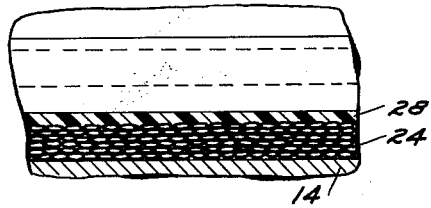
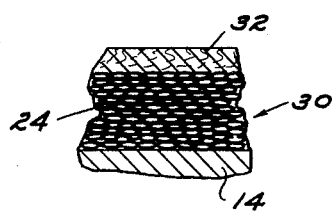
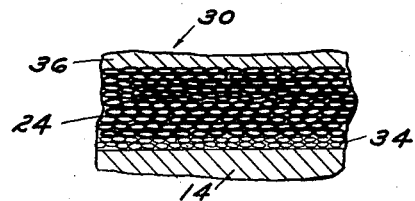
INVENTOR.
HAROLD E. RENAUD
BY
ATTORNEYS United States Patent Office 3,018,520
Patented Jan. 30, 1962

3,018,520
METHOD OF MOLDING BY SPRAYING MOLTEN METAL AND HEAT-REACTIVE BONDING AGENT
Harold E. Renaud, Okemos, Mich., assignor to Ren Plastics, Inc., Lansing, Mich., a corporation of Michigan
Filed Feb. 12, 1959, Ser. No. 792,915
20 Claims. (Cl. 18—48)

The present invention relates to an improved method of producing a wide variety of different types of metal-armored or faced, synthetic plastic bonded molds, dies, fixtures and like tooling, as well as special metal clad articles of other sorts, by which method many desired and improved attributes may be imparted to the product. More particularly, the invention relates to an improved molten metal spray procedure.

It has heretofore been proposed to employ a known metal spray gun technique, such as the Schoop metal spray process, in the production of metal skins, facings, etc. of specially shaped contour. In accordance with this procedure a mold of the desired shape and appropriate material is coated with a suitable parting agent, after which metal fed through a conventional metal spray gun is rendered molten by the latter and is air-pressure sprayed against the surface of the mold to build thereon the desired form. Upon cooling and solidifying the product is stripped from the mold, after which it may be appropriately backed for use.

It has been found that the molten metal pellets impinging the mold surface splash or bounce freely off the latter, only a small percentage adhering thereto, so that an excessive waste of material is experienced in building up a metal facing of desired thickness.

Efforts have been made to overcome this objectionable feature by first coating the mold surface with a synthetic plastic resin material of one sort or another, but I have found that the high heat of the molten pellets has the effect of charring the material of the coating, just as this tendency exists when a thermo-setting plastic is too intensely heated in curing.

Under controlled composition and conditions the deposited metal tends to curl out of a desired contour, as well as to have an undesirable surface roughness.

Moreover, the high heat of the pellets impinging the mold surface is destructive of the latter also, tending to cause blistering, charring or checking, with resultant imperfection of the exposed surface of the built-up form, as stripped from the mold. Typical molds of known plastic, plaster of Paris, wood and like materials heretofore employed are particularly subject to this defect of heat charring, crazing or checking.

Still more objectionable, since it goes to the character and quality of the product itself, is the fact that the build-up or lay-up of the metal of the facing or skin maintains its essentially particulate, granular or crystalline character upon solidifying. The deposited pellets have little strength of bond to one another, and little homogeneity of texture as compared with a truly fused and bonded metal lay-up The facing thus lacks not only desired surface fineness and smoothness, but also tends to curl, crumble, flake apart or similarly rupture under relatively moderate abrasive action, due to the lack of bond strength referred to.

Further, due to the electrically insulative property of the initial, pellet retaining coating of synthetic resin, when employed, the facing is not a good electrical conductor, hence is not efficiently electroplated should it be desired to do so in order to furnish the facing with a harder or smoother surface.

It further follows that the product of the prior art is a relatively inefficient one for uses in which good surface electrical conductivity is a desired attribute, such as when embodied in an electrode. The non-homogeneous metallic structure of previous spray deposited facings, coupled with the insulating effect of the plastic material, when used, unsuits the same as a practical matter for such conducting functions, just as metallic powder fillers mixed in a plastic or equivalent insulative vehicle or carrier result in a product having poor conductivity.

It is therefore an object of the invention to provide an improved method of producing various sorts of spray gun deposited metal facings of the type described, by which the above mentioned objections are avoided or overcome. While the invention deals in particular with the production of facings for molds, dies, models, fixtures and the like, such as are in wide industrial use, it is nevertheless to be understood that the method is also applicable, in a special adaptation or modification thereof (to be described), in the fabrication of various other sorts of special contour forms, to which the production of the metal spray gun technique is particularly suited. One example, as indicated above, is a form to be used as an electrical conductor or electrode.

More specifically, it is an object to provide a method in which, in accordance with one embodiment, a desired and uniform depth or thickness of the facing is built up by successive cycles of pre-treating and metal spraying operations on a master mold. In this procedure the mold is treated prior to each spraying step by applying thereto (or to a previously deposited layer) a coating of a synthetic resin, preferably an epoxy resin compound. This agent has the effect not only of preventing excessive and wasteful splashing of the molten metal from the mold upon impact, but also of causing an intimate bonding of the molten globules with one another in an improved manner at the instant of their being deposited.

In another embodiment of the invention the resin, in a partially reacted or B-stage and in admixture as a powder with hardener and metal particles (as will be described), may be applied directly from certain types of gun. The heat of the gun and the molten metal particles causes initiation and at least partial completion of the cure of the resin-hardener bonding component.

Upon impact with the mold the globules squash or flatten out, interfitting with one another in flatwise relation and being bonded strongly by the resin, as it is heat cured by the molten metal, in this interfitted relationship. Thus a very fine and well-knit, homogeneous internal structure of the facing results, as compared with the products of previous procedures.

In accordance with another aspect of the invention, the built-up facing may be produced with the surface electrical conductivity of its metal particles, as spray applied, or of another and better conducting metal, if desired. The duties of the facing may dictate, on the other hand, the need of a non-conducting external layer, such as a fused ceramic type, and the invention therefore contemplates the initial spray-application of such a layer.

Generally, it is an object to provide resin-bonded, metal clad or armored facings of the sort referred to above which have improved thermal stability, as to dimension under heat, due to the presence of the resin. This attribute is particularly advantageous in a metal working die, a die casting mold, and like operations involving considerable heat. To the same end, the invention contemplates the production of a facing of uniform wall thickness in all zones or areas thereof for desired application and/or dissipation of heat.

I have found an epoxy resin used as the bonding agent to be particularly desirable in reference to the functions mentioned above, though other organic or inorganic polymers may in varying degree serve as equivalents.

A further object is to provide a method as described in which the build-up of successive metal layers is carried out under a well controlled temperature condition, so as to avoid the drawbacks previously found in metal spray gun procedures as to charring the mold and/or the product. Thus the master mold is maintained under a high degree of refrigeration to prevent heat damage thereto, as well as to control the time of thermal setting of the resin employed as a bond promoting agent. As indicated, this is preferably an epoxy resin (and, further, a high heat type) because of its fine adhesive quality.

Yet another object is to provide a method in which the factors of the resin bonding agent, the molten sprayed metal and the temperature control by refrigeration intercontribute mutually in the production of an improved facing. That is, the resin occasions the desired integrating control and bond of the molten metal globules; the heat of the latter inaugurates the polymerization of the resin in each of the successive spraying cycles of the method, during which the molten pellets, as flattened against the mold on impact and interfitted are bonded and knit in a unitary layer; and the refrigeration retards and controls the time of completion of the thermo-setting and curing of the resin in each cycle. The result is a facing of very homogeneous composition as to internal structure, as thus produced in successive cycles whose number depends on the thickness desired. It is a facing of uniformly fine surface texture indeed.

A further object is to provide a method for the production of mold, die and like facings of the sort described in which the facing may be backed, and given necessary rigidity and body, in many different ways.

It is a particular object, though the principles of the invention are not limited thereto, to provide a controlled temperature, resin pre-treating and metal spray method, as described, which is ideally suited for the production, without extremely expensive and time consuming operations involving the use of Kellering or other pro-filing or duplicating equipment, of facings for many sorts of specially contoured molds, dies, fixtures, special electrodes, etc., employed in industry. Examples are hard dies as used in metal sheet forming, plastic prototype dies, die-casting molds, rubber and plastic sheet forming molds, welding and checking fixtures, glass fiber lay-up molds, slug shaping molds, non-erosive electrodes of special shape, etc., it being understood that facings as produced under the invention may, if desired, be suitably backed for mounting in associated press or like equipment, or otherwise treated as needed.

A further general object is to provide improved facings for articles of the described types, as produced by the method of the invention.

The foregoing as well as other objects will become more apparent as this description proceeds, especially when considered in connection with the accompanying drawings illustrating the invention, wherein:

FIG. 1 is a highly schematic view to illustrate in a simple way suitable inexpensive equipment by which the principles of the invention may be carried out, it being understood that in actual industrial practice equipment more suited for the control of production conditions will no doubt be employed;

FIGS. 2 through 5 schematically illustrate, in scale exaggerated for clarity and with no attempt at accuracy of proportion, successive steps in the practice of the improved method;

FIG. 6 is a fragmentary sectional view through a master mold and a portion of a facing formed thereon, being sectioned on a line corresponding to line 6—6 of FIG. 1 to show the approximate internal structure of the facing; and FIG. 7 is a view similar to FIG. 6 illustrating a special form or facing as produced by the method, but additionally furnished with an extra surface layer for improved electrical conductivity or other desired property.

FIG. 1 of the drawings will serve as a basis for a description in general terms of the method of the invention, being considered in conjunction with FIGS. 2 through 5 illustrating the effects following various steps of the procedure. It is to be clearly understood that it is the sole purpose of FIG. 1 to show schematically a very simple and elemental sort of procedural setup affording desired conditions for the practice of the method, particularly in regard to the refrigeration aspect thereof. Thus, while this arrangement involves the provision of Dry Ice for the cooling of a mold as molten metal is sprayed against the latter, in actual practice the cooling will no doubt be accomplished in a different manner, as in a deeply refrigerated cold room, by resort to liquid air or air components, by the blowing of refrigerated air past the mold, or by any combination of known refrigerating systems which is efficient.

It is the essential objective, in any operating setup, to permit the use of an inexpensively produced mold of synthetic plastic, plaster, wood, or the like, in place of more costly materials, and still prevent the destructive charring, not only of the mold but also of the thermally setting plastic material whose use is an essential feature of the present invention.

On this understanding, the reference numeral 10 in FIG. 1 designates a suitable refrigerant container, by which the refrigerating action to be described can be localized. Container 10 is charged to a suitable depth with Dry Ice, designated by the reference numeral 12, in broken up condition; and a suitable mold 14 is nested in this refrigerant, with an attempt made to maintain an equal amount or depth of the refrigerant Dry Ice against all of the various angularly related surfaces of the mold 14.

The mold 14 may, if desired, be of metal, for improved heat conducting qualities, or, as indicated above, it may be fabricated of wood, plaster of Paris, a suitable lay-up of a known synthetic resin, or like material.

In the interest of uniform heat conductivity through the mold at any of the various surfaces thereof, it is formed in a uniform cross sectional thickness across these surfaces, with which the refrigerant 12 is in intimate heat conducting relation. This is an important feature.

In preparation of the mold 14, it is first given an application of an appropriate parting agent in paste or sprayed film form, such as a water soluble polyvinyl alcohol. If desired, a further heat protective parting agent, as of the silicone type, may also be applied, although the refrigerant principle of the invention will ordinarily render this non-essential; and in any event, the nature of the particular parting agent or agents which are employed constitutes no part of the present invention.

Upon drying of the parting agent, all exposed surfaces of the mold 14 are given a liberal coating of the heat-polymerizable resin which is to serve as the bonding agent for the molten metal subsequently sprayed thereon. Subject to resort to other organic and inorganic materials for a similar function, and because of its very fine adhesive or bonding quality, as well as dimensional stability under thermal change, an epoxy resin is preferably employed for this initial coating, which is generally designated by the reference numeral 16. It is a condensation product under alkaline conditions of a chlorohydrin and a polyolphenol, more specifically a condensation product of epichlorohydrin and bis-phenol A, as mixed with a suitable hardener, such as polyfunctional amine hardener having available active hydrogens to form a reaction product with the epoxy-bis-phenol adjunct. By preference, this resin is one designated a high heat type, as specified by A.S.T.M. Procedure No. D648-45T, using 264 pounds per square inch fiber stress. Further, if desired, this resin may contain fillers, such as silica or clay, to control viscosity, and/or metal powders which are preferably, but not necessarily, of the same metal or alloy which is to be sprayed.

With the mold 14 coated in this fashion, a known type of metal spray or flame spray gun 18 is employed to direct an intense spray of molten metal particles or globules onto the coated surface. Gun 18 conventionally employs a reel supporting a coil of the metal or metal alloy to be sprayed, designated 20, and is supplied with air pressure and gas feed lines 22 (oxy-acetylene, for example), in the known way. It is preferred that the air pressure be maintained as low as possible, for example 40 pounds per square inch, in order to minimize the tendency of molten globules or particles to bounce off the mold surface on impact. Similarly, a degree of heat at the gun merely sufficient to melt the metal should be employed.

The operator proceeds to direct the spray against the mold surfaces, continually moving the gun 18 longitudinally and transversely of the mold 14, in an attempt to keep the deposition of metal as uniform as possible in this manner. Likewise, the gun is kept at a sufficient distance from the mold to minimize the impact of the globules against the latter, and resultant tendency to disturb uniformity of deposition and bounce off the mold's surface; and it may be noted that in this respect the gun 18 will normally be held at a greater distance from the mold than is shown in FIG. 1 of the drawings.

FIG. 2 shows the mold 14 as initially furnished with the resin coating 16. FIG. 3 illustrates in a general way what happens as the spraying procedure is carried forward. Individual minute globules 24 of the sprayed metal squash or flatten out as they strike the resin coating 16 and are kept by the latter from bouncing away. As thus restrained, they are interleaved, knit, or meshed laterally with one another, being intimately bonded by the resin 16 at meeting surfaces. As the spraying proceeds, the thickness of the layer builds up progressively, with corresponding overlap of flattened particles relative to those previously deposited; and as this occurs, the resin 16, polymerization of which is started by the heat of the molten pellets, floats upwardly above the deposited metal, in a residual pool or layer 26 (FIG. 3). This residual pool remains fluid until the polymerization proceeds to near completion, as will be described.

As the spraying procedure continues, all of the floating pool 26 of resin is consumed in the bonding action on the metal particles 24, as illustrated in FIG. 4, and thereafter the resin proceeds further towards a cured condition, in which ultimately, it reaches a point in which it is simply tacky to the feel. At this point it is in order to apply a second layer 28 of the resin, as shown in FIG. 4.

It is to be emphasized, as one of the important features of the invention, that the heat of the minute molten particles or globules impinging and flattening on the mold 14 is at all times during the spraying step efficiently, rapidly and uniformly carried away through the mold 14, as well as by convection, by the refrigerating agency and/or surrounding atmosphere. Charring and like destructive action on both the mold 14 and the resin bonding agent is impossible, thus permitting the use of inexpensive materials for the mold, as mentioned above, while insuring a finely surfaced and textured product, in which the flattened, overlapped and interfitted or interleaved particles 24, as bonded in flat-wise contact with one another, provide a homogeneous, strong, and dimensionally stabilized layer.

With the second resin coating 28 applied as in FIG. 4, again in an amount sufficient to provide an available excess, the process is repeated. As before, the molten particles are deposited in interleaved relation to one another, in a random way, the excess pool 26 of resin floating thereabove being progressively diminished in thickness as it is absorbed in the bonding action above described. This second molten spray operation is also carried out until all of the remaining resin has been absorbed, and has proceeded toward the tacky condition which signals that the application of a successive resin layer is in order.

The above described method steps are repeated until the desired thickness of the metal facing, generally designated in FIG. 6 by the reference numeral 30, is accomplished. Initiation of the polymerization of the successive layer is accomplished by the heat of the metal spray; the successive layers are integrally bonded to one another by the resin, just as their constituent globules are bonded to one another, and the duration of the period of polymerization of the resin, in each layer, is controlled or slowed down by the refrigerant medium, whether the Dry Ice 12 of FIG. 1, or any of the other practical alternatives described above.

When the desired thickness of the facing 30 is built up in the above manner, it is desirable to back up the facing; and this may be done in various ways, although the backing, generally designated 32, and its particular character do not constitute part of the invention, necessarily.

Thus the backing 32 may serve as a reinforcement to facilitate stripping of the final facing 30 from the mold 14, and may be composed of a fiber sheet or cloth, or lay-up of such sheets or cloths, impregnated in a suitable resin similar to that employed in the spraying procedure. It may be glass mat or paper, cotton or other fabric or paper, or a suitable metal cloth or screen, steel wool, and the like, may be employed for the basic material of the backing or reinforcement 30.

Prior to or after stripping of the facing 28 from the mold, polymerization thereof can be completed, if necessary, without shrinkage by subjecting the piece to a cure cycle normally used with the particular polymerizable plastic, and/or subsequent exposure to high frequency radiation.

While, as indicated above, the simple equipment of FIG. 1 is intended primarily for the purpose of illustration, it may be mentioned that in the procedure as actually thus carried out the gun 18 is best held at about 12″–15″ from the mold surface as it is swept at a uniform rate along and across the entire surface. The effect of the spray is to cause a desirable continuous circulation of the cold air across the mold, which effect may be further augmented if desired. Excessive heat is avoided which, even if it does not produce charring as described above, tends to cause the initial parting agent to foam or bubble. This tendency may be countered by the use of a heat protective parting agent, as of the silicone type, as mentioned above. The facing may be built up in any desired thickness, for example ⅛″ or 3/16″ to as much as ½″.

The facing is one composed of metal particles bonded extremely intimately to one another in a novel and improved manner. The introduction of the metal particles by flame or molten pellet spraying, and especially the shape of the particles when so sprayed, as flat particles which overlap each other, results in improved bond and tensile strength of the facing 28.

Further, the use of cooling in one way or another, allows use of plastic, wood, or plaster molds, in place of more costly metal molds, and prevents charring of the thermosetting plastic. Cooling also affords a way of controlling the setting time.

The metal-plastic product accurately duplicates, in reverse, the surface of the plastic, plaster, wood, or metal mold 14 and the structure can be further strengthened by application of plastic laminated or like reinforcement 30 before removal from the mold. Further reinforcement may, if desired or necessary, be provided by filling the void portions of the object with any of the following:

(1) A mass-cast resinous composition, either thermosetting or thermoplastic, filled or unfilled.

(2) A plastic foam or other foamed material.

(3) Metal casting material.

(4) Metal balls or bars in random or packed arrangement.

(5) Plaster or similar inorganic material.

Still further reinforcement may be obtained, if necessary, by use of a rigid framework, with or without any of the five previous reinforcements, said framework being built from plastic tubing, wood, or metal. Furthermore, if the intended use of the product so indicates, as in conjunction with a metal draw die, appropriate metal inserts may be incorporated at corners or edges where it is desired to iron out wrinkles in the metal as it is forced into the draw die.

It is to be particularly noted that die or like facings, as produced in accordance with the present invention, are well adapted for use in a die structure of the type shown in my Patent No. 2,510,907 of June 6, 1950, in which heat conductive balls are employed for thermal control. The facing is also well adapted for use in a die such as is the subject matter of my copending application, Serial No. 331,255, filed January 14, 1953 and now abandoned; and it has the advantage that, in the event of damage to or excessive wear on the same in use, the facing may simply be removed from the die backing or body and replaced. It is unnecessary to construct an entirely new die.

The metal employed in spraying may be any sprayable metal or alloy, such as steel, iron, bronze, tin, zinc, nickel, brass, copper, etc. Polymerizable plastics which may be employed include, but are not necessarily limited to:

(1) Polyester and phenol-formaldehyde resins, (2) Epoxy resins and other polyglycidyl ethers and polyepoxy compounds, (3) Polyurethane and polyurea resins, (4) Inorganic polymers, such as phosphonitrilic chloride and other inorganic polymers based on phosphorous, nitrogen, boron and/or sulfur in various combinations, (5) Acrylic, urea-formaldehyde and melamine formaldehyde resins, (6) Polycarbonates, (7) Polymerized furfuryl alcohol, (8) Aldehyde-amine and ketone-amine resins, (9) Irradiated polyethylene and other essentially vinyl types.

(10) Silicones.

The finished product is characterized by accurate duplication of the mold surface; excellent dimensional stability, having no shrinkage or warping at temperatures up to the heat distortion temperature of the system; surface hardness, impact resistance and uniform and good thermal conductivity due to its metallic component coupled with dimensional stability under heat change due to its resin bonding agent.

As pointed out above, it is the use of a mold 14 of uniform thickness, the presence of the resin bonding agent, and the maintenance of a properly refrigerated temperature control while depositing metal to a uniform thickness that result in the production of a facing or like product which does not curl out of true contour, nor disintegrate, roughen or check at its surface, as has been found to be the case in other flame spray-deposited products. The mold 14 is protected by the same factors of thermal control and product composition and thickness.

As an alternative to the successive steps of applying heat curable coatings, each followed by a spraying of molten metal, the invention also contemplates the use of a thermosetting resin or like bonding agent in a partially reacted or B-stage at a flame spray gun of a type adapted to handle a powdery or particulate material. Thus, a B-staged, free-flowing, partially reacted powder, such as a high-heat epoxy or phenolic resin powder, an alkyd or other polyester molding powder, or the like, is applied along with the metal (in a like particulate form of the latter) directly from a proper type of gun, under the refrigerated condition or conditions described above.

In this procedure the B-stage resin and hardener are ground to a powder and mixed with the metal particles, the mixture being supplied to the hopper of the gun. The gun heats and melts the metal, resin and hardener components and the metal globules are deposited on the mold in the condition described above, each encased in a bonding sheath of the resin.

Obviously, proper design of the gun will allow such concurrent spraying of the unpolymerized resin, the heat of the metal particles causing cure of the resin; and this sort of spraying procedure is carried out continuously until the desired thickness of facing 30 is attained, and the resin is cured to the desired extent.

In the manufacture of facings or like forms by any of the herein-described embodiments of the process, it is important to have uniformity of wall thickness, both of the walls of the mold 14 being duplicated and in the metal-faced form made from it, whatever such respective thicknesses may be. This is necessary for uniform heat transfer, both during preparation, and in the operation of, the metal-faced product, and whether it may be desired to apply heat to or carry away heat from that product in its use.

If it is found that the surface electrical resistivity of the facing is relatively high in forms made by the procedures described above, due to the fact that each metal particle is completely surrounded by resinous material, it is desirable (in order to use such facing as an electrode, for example, of the so-called Elox type, or to enable efficient electroplating of the product) to apply an outer conductive coating, preferably of the same metal, to the facing.

On the other hand, a non-metallic sort of external facing layer may be desired, such as a glazed ceramic layer. If this is the case the spray gun may be charged with a suitable silicate material, which is melted by the gun's heat and applied as fused globules to the mold surface. Thereafter the method proceeds as described above.

Thus, referring to FIG. 7 of the drawings, the mold 14, under refrigeration and with a suitable parting agent applied thereto, but lacking a resin coating 16 as in the first embodiment, is given an initial and spray-deposited layer 34 of the pure metal or alloy pellets or particles 24, in a desired and uniform thickness of, say, .060 inch. This imparts desired electrical conductivity, and thereafter the process of the invention is carried out on the metal layer 34, in accordance with either of the embodiments described above.

With or without appropriate backing 36 (FIG. 7), the facing may be drilled, punched or otherwise treated as desired, for example for the purpose of circulating a flushing liquid in the use of a manifold type of electrode in the Elox process; for the attachment of electrical conductors; for the attachment of the product to a support, etc.

The facing, produced by any of the above procedures, may be used as a production metal punch die facing, an injection mold facing, and the like. As an Elox electrode it can handle high amperage and has the advantage that its resin bonded body resists erosion under electrical action better than an electrode of pure metal. Other types of tools to which the use of plastics has recently been applied, such as checking fixtures, draw dies, welding fixtures, drill fixtures, and the like, offer other fields for the application of the invention.

What I claim as my invention is:

1. A method of making a facing or like product, comprising the steps, at least in part performed in a refrigerated atmosphere, of spray-applying molten metal particles onto a mold surface contoured reversely of said product, while bonding said particles to one another by a thermosetting bonding agent and advancing the curing of said agent under the heat of the molten metal, and continuing said application of said bonding agent and particles until the latter are built up and bonded by said agent in a facing layer of desired depth greatly exceeding their individual thickness, which layer is substantially homogeneous throughout its thickness in regard to the distribution of metal and bonding agent therein, and said agent has been substantially cured by the heat of the molten metal.

2. A method of making a facing or like product, comprising the steps, at least in part performed in a refrigerated atmosphere, of spray-applying molten metal particles onto a mold surface contoured reversely of said product, while bonding said particles to one another by a thermosetting bonding agent previously applied to said surface, and advancing the curing of said agent under the heat of the molten metal, and continuing said application of said bonding agent and particles until the latter are built up and bonded by said gent in a facing layer of desired depth greatly exceeding their individual thickness, which layer is substantially homogeneous throughout its thickness in regard to the distribution of metal and bonding agent therein, and said agent has been substantially cured by the heat of the molten metal.

3. A method of making a facing or like product, comprising the steps, at least in part performed in a refrigerated atmosphere, of spray-applying molten metal products onto a mold surface contoured reversely of said product, while bonding said particles to one another by a thermosetting bonding agent spray-applied to said surface with said particles and advancing the curing of said agent under the heat of the molten metal, and continuing said application of said bonding agent and particles until the later are built up and bonded by said agent in a facing layer of desired depth greatly exceeding their individual thickness, which layer is substantially homogeneous throughout its thickness in regard to the distribution of metal and bonding agent therein, and said agent has been substantially cured by the heat of the molten metal.

4. A method of making a facing or like product, comprising the steps, at least in part performed in a refrigerated atmosphere, of spray-applying molten metal particles onto a mold surface contoured reversely of said product to provide a fused external, electrically conductive layer of said product, spray-applying and bonding further molten metal particles to said layer, while bonding said further particles to one another by a thermosetting bonding agent and advancing the curing of said agent under the heat of the molten metal, and continuing said application of said bonding agent and further particles until the later are built up and bonded by said agent in a further facing layer of desired depth greatly exceeding their individual thickness, which layer is substantially homogeneous throughout its thickness in regard to the distribution of metal and bonding agent therein, and said agent has been substantially cured by the heat of the molten metal.

5. A method of making a facing or like product, comprising the steps of applying to a mold which is contoured reversely of said product a surface of a heat-reactive bonding agent in a fluid condition, spraying hot molten metal particles on said surface to cause said agent to progress toward a cured and bonding condition and the particles to become bonded by said agent in a layer, and continuing said spraying of the mold until substantially all of said bonding agent is absorbed in said particle bonding function.

6. A method of making a facing or like product, comprising the steps of applying to a mold which is contoured reversely of said product a surface of a heat-reactive bonding agent in a fluid condition, spraying hot molten metal particles on said surface while maintaining said mold under refrigeration to cause said agent to progress toward a cured and bonding condition and the particles to become bonded by said agent in a layer, and continuing said spraying of the refrigerated mold until substantially all of said bonding agent is absorbed in said particle bonding function.

7. A method of making a facing or like product, comprising the steps of applying to a mold which is contoured reversely of said product a surface of a heat-reactive bonding agent in a fluid condition, spraying hot molten metal particles on said surface while maintaining said mold under refrigeration to cause said agent to progress toward a cured and bonding condition and the particles to flatten upon impact and become bonded by said agent in a layer of flatwise overlapping and interleaved particles, and continuing said spraying of the refrigerated mold until substantially all of said bonding agent is absorbed in said particle bonding function.

8. A method of making a facing or like product, comprising the steps of applying to a mold which is contoured reversely of said product a surface of a heat-reactive bonding agent in a fluid condition, spraying hot molten metal particles on said surface while maintaining said mold under refrigeration to cause said agent to progress toward a cured and bonding condition and the particles to flatten upon impact and become bonded by said agent in a layer of flatwise overlapping and interleaved particles, continuing said spraying of the refrigerated mold until substantially all of said bonding agent is absorbed in said particle bonding function, coating said layer with further bonding agent, and repeating said spraying step to build up a further layer bonded to said first layer by said bonding agent and having its particles similarly bonded by said agent.

9. A method in accordance with claim 5, in which said bonding agent is an epoxy resin.

10. A method in accordance with claim 5, in which said bonding agent is an epoxy resin of the high heat type.

11. A method in accordance with claim 5, in which said bonding agent is a resin of the polyester type.

12. A method in accordance with claim 5, in which said bonding agent is a resin of the phenol-formaldehyde type.

13. A method in accordance with claim 5, in which said bonding agent is a resin of the polyurethane type.

14. A method in accordance with claim 5, in which said bonding agent is an inorganic polymer.

15. A method in accordance with claim 5, in which the fluid coating of said bonding agent is applied to said mold as a preliminary operation preceding the spraying of said molten metal particles.

16. A method in accordance with claim 5, in which the fluid coating of said bonding agent is applied to said mold as a preliminary operation preceding the spraying of said molten metal particles, and in which at least one further similar coating is applied, after said absorption of said bonding agent, followed by a further similar particle spraying operation.

17. A method in accordance with claim 5, in which said bonding agent is applied to said mold as a spray of fluid particles simultaneously with said spraying of said metal particles.

18. A method in accordance with claim 5, in which said bonding agent is a thermo-setting one, and in which said agent is well advanced to a thermally cured and set condition by the heat of the molten metal.

19. A method in accordance with claim 8, in which said bonding agent is a thermo-setting one, and in which said agent is well advanced to a thermally cured and set condition by the heat of the molten metal.

20. A method in accordance with claim 5, in which said bonding agent is applied to said mold as a spray of fluid particles simultaneously with said spraying of said metal particles, said bonding agent being a mixture of B-staged, partially reacted resin and hardener powders.

References Cited in the file of this patent

UNITED STATES PATENTS

| | | |
|---|---|---|
| 1,920,244 | Connelly et al. | Aug. 1, 1933 |
| 2,120,406 | Hansen | June 14, 1938 |
| 2,264,003 | Osenberg | Nov. 25, 1941 |
| 2,344,960 | Beal | Mar. 28, 1944 |
| 2,642,654 | Ahrens | June 23, 1953 |
| 2,659,137 | Leontis et al. | Nov. 17, 1953 |
| 2,704,105 | Robinson et al. | Mar. 15, 1955 |
| 2,728,124 | Sofield | Dec. 27, 1955 |
| 2,764,516 | Pace | Sept. 25, 1956 |
| 2,765,248 | Beech et al. | Oct. 2, 1956 |
| 2,837,772 | Deakin | June 10, 1958 |

FOREIGN PATENTS

| | | |
|---|---|---|
| 509,196 | Great Britain | July 12, 1939 |
| 84,738 | Netherlands | Apr. 15, 1957 |